United States Patent
Johnston et al.

(10) Patent No.: US 6,602,459 B1
(45) Date of Patent: Aug. 5, 2003

(54) DUAL-CHAMBER CONTAINER, AND METHOD AND APPARATUS FOR ITS MANUFACTURE

(75) Inventors: Richard R. Johnston, Toledo, OH (US); Michael Hsieh, Perrysburg, OH (US)

(73) Assignee: Owens-Brockway Plastic Products Inc., Toledo, OH (US)

(*) Notice: Subject to any disclaimer, the term of this patent is extended or adjusted under 35 U.S.C. 154(b) by 0 days.

(21) Appl. No.: 09/961,961

(22) Filed: Sep. 24, 2001

(51) Int. Cl.[7] .................. B29C 49/04; B29C 49/06; B65C 1/04
(52) U.S. Cl. .............. 264/537; 264/539; 264/540; 215/6
(58) Field of Search ................. 264/537, 539, 264/540; 215/6

(56) References Cited

U.S. PATENT DOCUMENTS

| | | |
|---|---|---|
| 2,940,120 A | 6/1960 | Grebowiec |
| 3,124,281 A | 3/1964 | Stull |
| 3,276,642 A | 10/1966 | Johnson, Jr. et al. |
| 3,826,397 A | 7/1974 | Atkins |
| 3,828,962 A | 8/1974 | Atkins |
| 4,179,044 A | 12/1979 | Fitte |
| 4,724,116 A | 2/1988 | Aoki |
| 4,779,749 A | 10/1988 | Geiger |
| 5,135,702 A | 8/1992 | Eales |
| 5,398,828 A | 3/1995 | Valyi .................. 215/396 |
| 5,573,143 A | 11/1996 | Deardurff et al. |
| 5,579,937 A | 12/1996 | Valyi |
| 5,804,227 A | 9/1998 | Deardurff et al. |
| 5,837,170 A | 11/1998 | Valyi |
| 5,848,717 A | 12/1998 | Bosl et al. |
| 5,849,241 A | 12/1998 | Connan |
| 5,882,574 A | 3/1999 | Geisinger .................. 264/539 |

Primary Examiner—Suzanne E. McDowell

(57) ABSTRACT

A method of fabricating a dual-chamber plastic container in an injection/extrusion/blow-molding operation, in which a container finish is first injection molded. The finish mold tooling is then moved axially upwardly as plastic continues to be extruded through extrusion tooling in which an orifice bushing surrounds a mandrel tip. The mandrel tip has a passage through which plastic is extruded to form a wall that divides the extruded tube into separate chambers. Blow molds are brought in from both sides to capture the extruded tube, and air is blown through a passage in the finish mold tooling to blow the tube chambers to the confines of the mold.

12 Claims, 4 Drawing Sheets

US 6,602,459 B1

DUAL-CHAMBER CONTAINER, AND METHOD AND APPARATUS FOR ITS MANUFACTURE

The present invention is directed to a dual-chamber container of integrally molded plastic construction, and to a method and apparatus for extrusion blow molding such a container.

Reference is made to the concurrently filed application of Gregory A. Geisinger Ser. No. 09/961,960 and assigned to the assignee hereof.

BACKGROUND AND SUMMARY OF THE INVENTION

It has heretofore been proposed to provide a dual-chamber container by extrusion blow molding separate container sections and then securing the sections to each other to form a unitary container assembly. U.S. Pat. No. 5,823,391 is exemplary of this technology. An object of the present invention is to provide a method and apparatus for extruding and blow molding a one-piece integrally formed dual-chamber container in which the container is divided by a wall that is extruded simultaneously with the container sidewalls prior to blow molding, and remains intact during and after blow molding.

A method of making a dual-chamber plastic container in accordance with one aspect of a presently preferred embodiment of the invention includes extruding a tubular plastic body having a peripheral wall and an integrally extruded internal wall dividing the body into separate chambers. The tubular body is captured between mold segments, and the peripheral wall is blow molded within the mold segments by application of air to the chambers simultaneously and at equal pressures. The blow molded container is then removed from the mold segments. In the presently preferred embodiment of the invention, a container finish is first injection molded having a pair of spaced outlet openings, and the hollow tubular body is extruded from the container finish with the central wall extending from between the outlet openings. The finish is injection molded within finish mold tooling by extruding plastic through extrusion tooling that includes an orifice bushing surrounding a manifold tip. The tube is then extruded from the injection molded finish by moving the finish mold tooling relative to the extrusion tooling while continuing to extrude plastic through the extrusion tooling. The mandrel tip of the extrusion tooling includes a central passage through which plastic is extruded to form the central wall. The finish mold tooling includes a core having an air passage with a single inlet and spaced outlets for registry with the chambers. In the most preferred embodiment of the invention, the central wall is planar in the container as molded and sufficiently thin to flex for at least limited self-leveling of fluids between the chambers. In the most preferred embodiment of the invention, the central wall is no more 0.015 inch thick in the container as molded.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
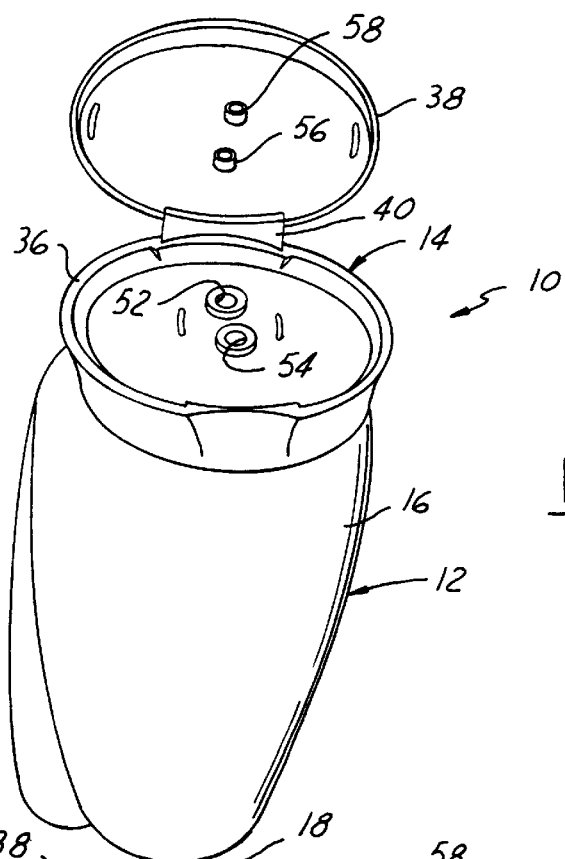
FIG. 1 is a perspective view of a container and closure package in accordance with a presently preferred implementation of the invention.
Figure 2:
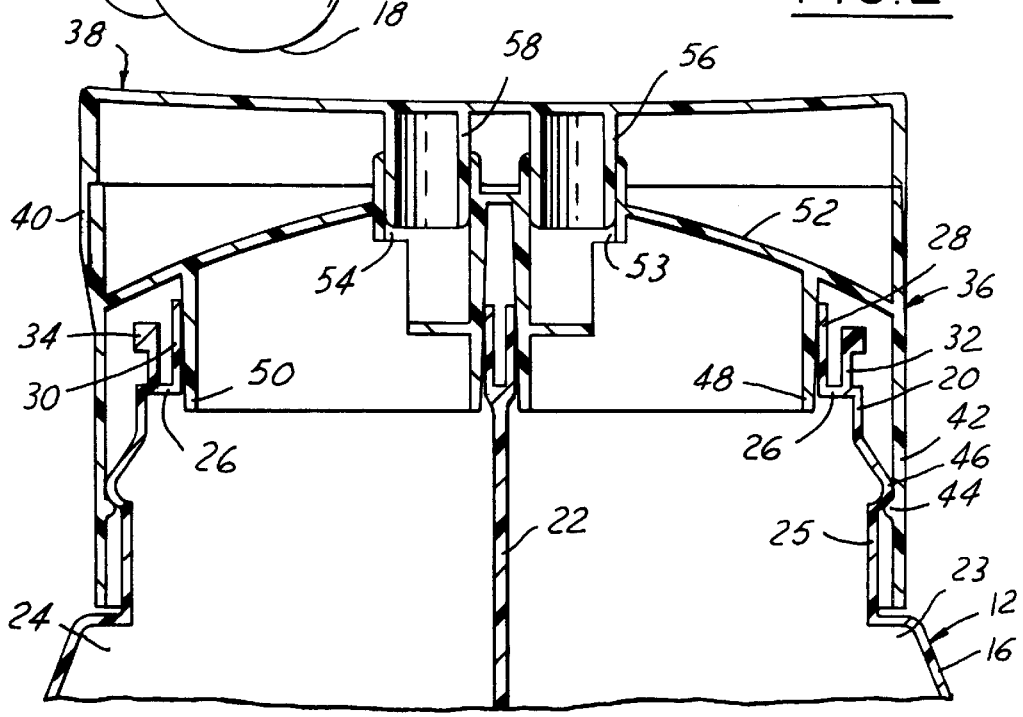
FIG. 2 is a fragmentary sectional view that laterally bisects the container and closure package in FIG. 1.
Figure 3:
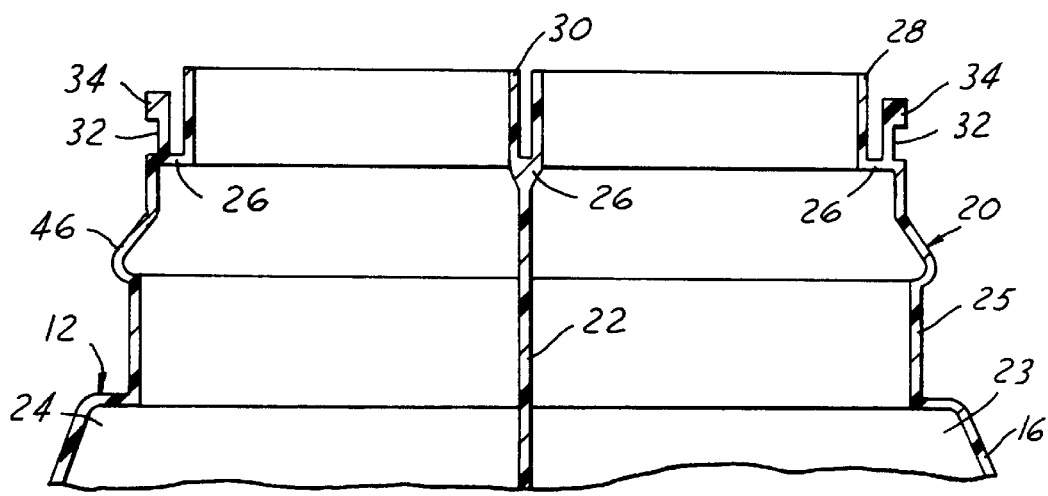
FIG. 3 is a fragmentary sectional view that laterally bisects the container finish in the embodiment of FIGS. 1 and 2.

FIGS. 1–3 illustrate a container and closure package 10 in accordance with a presently preferred embodiment of the invention as comprising a one-piece integrally molded dual-chamber plastic container 12 and a closure 14 secured to the container. Container 12 has a hollow body with a peripheral sidewall 16, a closed bottom 18 and a container finish 20 to which closure 14 is secured. An imperforate central web or wall 22 extends from finish 20 to closed bottom 18 so as to divide container 12 into dual adjacent chambers 23, 24. Finish 20 includes a wall 25 extending upwardly from sidewall 16. A flat deck 26 extends across the upper end of wall 25 spaced sidewall 16. A pair of annular walls 28, 30 extend upwardly from deck 26 to form a pair of outlet openings in respective registry with chambers 23, 24 of container 12. (It will be appreciated that directional adjectives such as "upper" and "upward" are used by way of description and not by way of limitation with respect to the orientation of the container and closure illustrated in FIGS. 1–3.) Wall 22 extends from the underside of deck 26 between annular outlet-forming walls 28, 30. An outer ring 32 extends axially from deck 26 surrounding walls 28, 30. A lip 34 extends radially outwardly from the upper end of ring 32.

Closure 14 (FIGS. 1 and 2) includes a base 36 secured to container finish 20, and a lid 38 coupled to base 36 by an integral hinge 40. Closure base 36 has a peripheral wail 42 with a radially inwardly extending bead 44 that is received by snap-fit over a radially outwardly extending bead 46 on container finish wall 25. Beads 44,46 may be circumferentially continuous or segmented. A pair of annular walls 48, 50 extend downwardly from a base wall 52 of base 36 in plug-sealing engagement with a container finish annular walls 28, 30 respectively. A pair of outlet openings 53, 54 are formed in closure base wall 52, and an associated pair of plug seals 56, 58 extend from closure lid 38. To dispense product from within package 10, closure lid 38 is first moved to the open position as illustrated in FIG. 1. Container sidewall 16 is then squeezed to dispense product from within chambers 23, 24 simultaneously. The package may be employed for two-part body wash or shampoo, for example. The products do not mix until after emerging from openings 53, 54. Container sidewall 16 may be of translucent construction to permit a user to observe the levels of product within the respective chambers. It is preferable that wall 22 should be sufficiently thin, preferably no more than 0.015 inch thick, to permit limited self-leveling between the respective chambers by flexure of the web.

Figure 4:
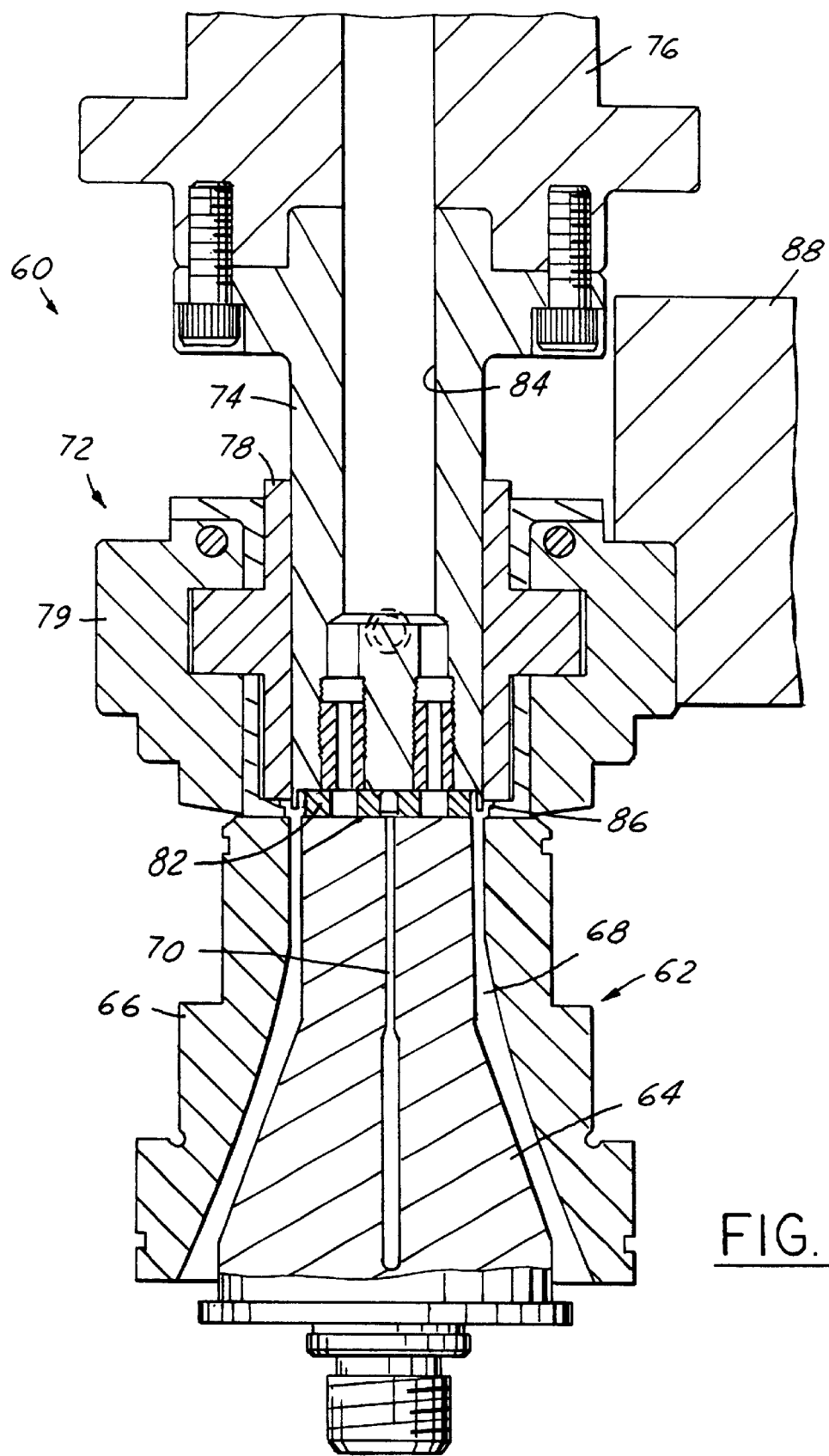
FIGS. 4 and 5 are fragmentary views that illustrate tooling for fabricating the container of FIGS. 1–3.
Figure 5:
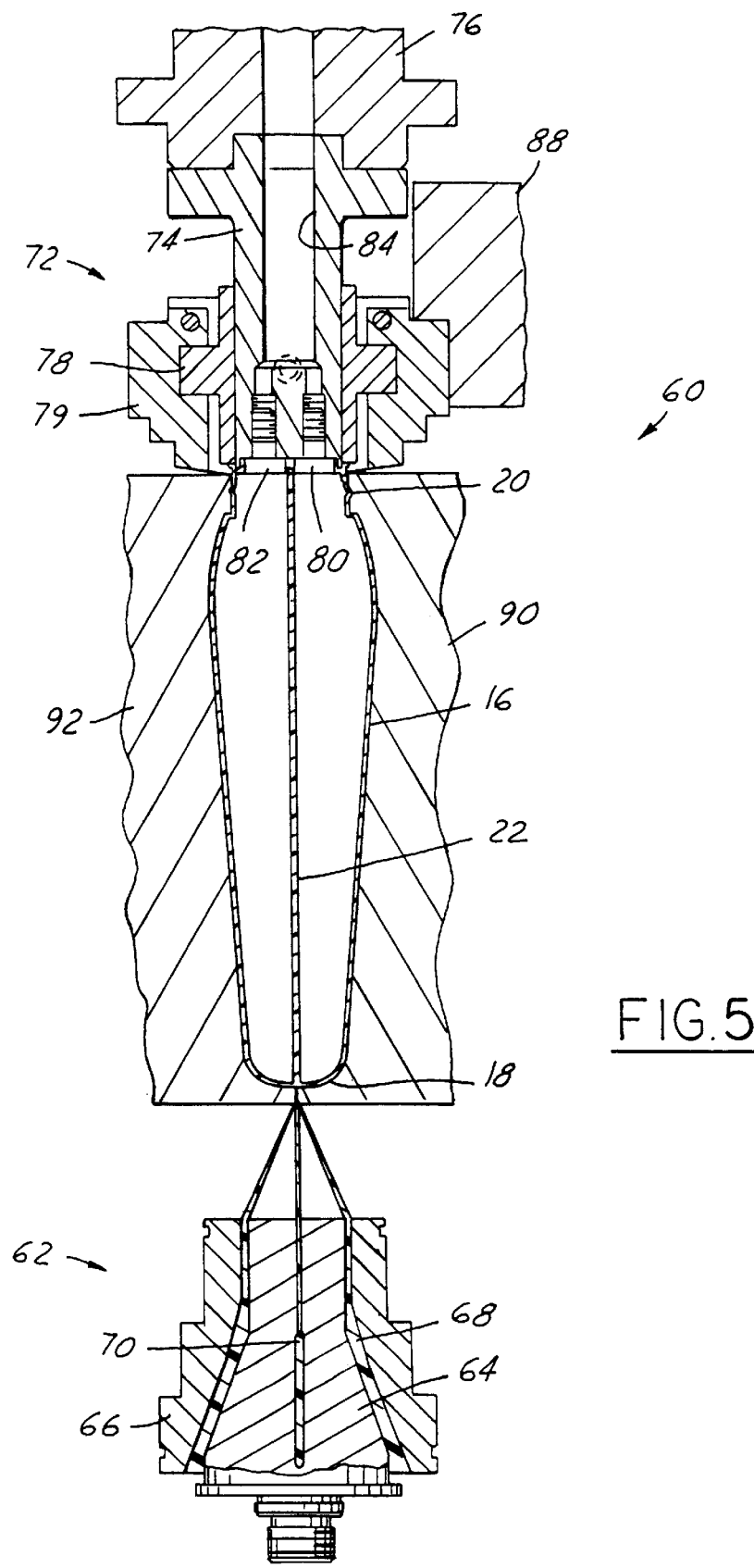

FIGS. 4 and 5 illustrate a method and apparatus 60 for forming container 12 in accordance with a presently preferred implementation of the invention. Mold apparatus 60 preferably includes extrusion tooling 62 and finish mold tooling 72. Extrusion tooling 62 includes a mandrel tip 64 surrounded by an orifice bushing 66. There is an annular space 68 provided between the opposing surfaces of mandrel tip 64 and orifice bushing 66, through which plastic is extruded upwardly (in the orientation of FIGS. 4 and 5) from a suitable extruder (not shown). A central passage 70 extends diametrically through mandrel tip 64 for extruding container wall 22. Finish mold tooling 72 includes a mold core 74 mounted on a mold core insert adapter 76. A finish insert 78 is secured to a neck ring 79 and supports mold core 74. A pair of finish plugs 80, 82 are mounted at the lower end of mold core 74. An air passage 84 has an inlet at the upper end of mold core 74, extends longitudinally through mold core 74, branches within mold core 74, and then is directed through the hollow interiors of insert plugs 80, 82.

With finish mold tooling 72 in opposed abutment with extrusion tooling 62 as illustrated in FIG. 4, plastic material extruded through passages 68, 70 flows into the finish mold cavity 86 formed between neck ring 79, finish insert 78, mold core 74 and plugs 80, 82. This cavity 86 forms deck 26 (FIG. 3), annular outlet-forming walls 28, 30, outer ring 32 and lip 34. Neck ring holder 88 is then employed to lift finish mold tooling 72 axially upwardly relative to extrusion tooling 62 while plastic is continuously extruded through passages 68, 70. Lip 34 helps retain the container finish in finish mold tooling 72 during this process. A tube is thus extruded between finish mold tooling 72 and extrusion tooling 62 having a circumferentially continuous peripheral wall formed by plastic flowing through passage 68 and a central web or wall formed by plastic flowing through passage 70. This wall is integral with and extends from the underside of the finish deck between the outlet openings, and is integrally extruded with the peripheral sidewall. At the upper position of finish mold tooling 72 (FIG. 5), a pair of mold segments 90, 92 are brought laterally inwardly to capture the extruded tube. The tube is pinched off adjacent to extrusion tooling 62 to form the closed container bottom. Air is then fed through passage 84 and the hollow interiors of plugs 80, 82, simultaneously and at equal pressures, to the chambers of the extruded tube to mold the extruded tube to the confines of mold segments 90, 92. Mold segments 90, 92 are then opened and the completed container is removed from the mold tooling. Finish mold tooling 72 is then brought back down into abutment with extrusion mold tooling 62, and the process is repeated.

Figure 6:
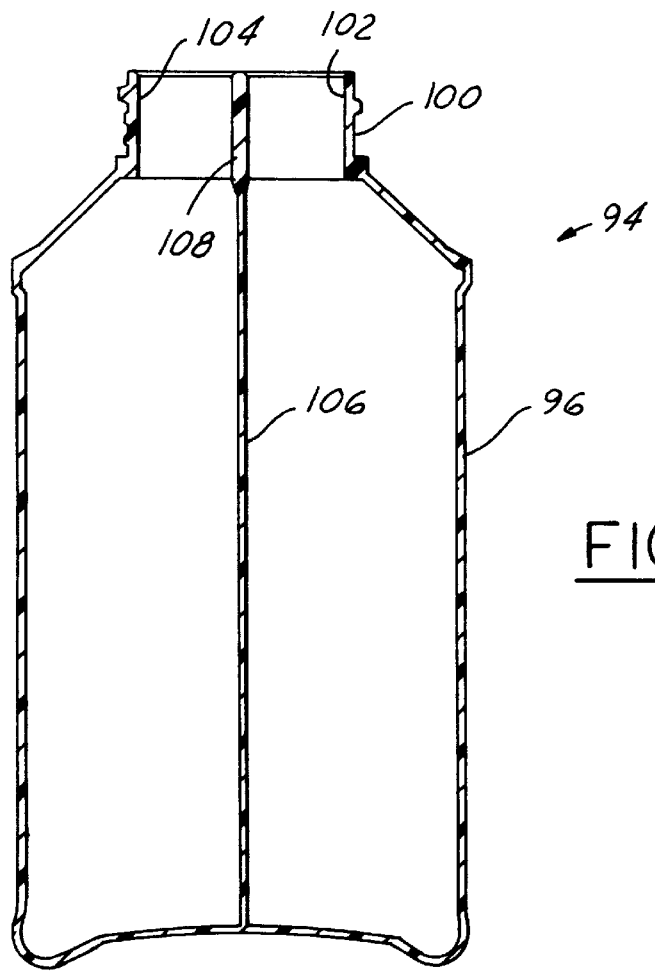
FIG. 6 is an elevation view that laterally bisects a dual-chamber container in accordance with a modified embodiment of the invention.

FIG. 6 illustrates a modified container 94 that may be fabricated in accordance with the present invention. Container 94 includes a continuous sidewall at 96, a closed bottom 98 and a finish 100 with laterally spaced outlet openings 102, 104. A central web or wall 106 divides the body of the container into separate chambers, which are respectively in registry with outlet openings 102, 104. Web 106 is integral with the wall 108 that separates outlet openings 102, 104.

There have thus been disclosed a method and apparatus for fabricating a dual-chamber container, and a dual-chamber container fabricated employing such method and apparatus, that fully satisfy all of the objects and aims previously set forth. The method and apparatus of the invention have been disclosed in conjunction with a container injection/extrusion/blow-molding process. Processes of this type are illustrated, for example, in U.S. Pat. Nos. 2,804,654, 3,008,192 and 3,040,376. The container in accordance with the broadest aspects of the invention may also be fabricated in an extrusion blow molding operation, as illustrated for example in U.S. Pat. Nos. 3,029,467, 3,767,747, 3,781,395, 3,978,184 and 4,118,452, in which the container finish is blow molded simultaneously with the container body, rather than being injection molded prior to extrusion of the preform for the container body. The container and closure package has also been illustrated in conjunction with a closure adapted for simultaneous dispensing of the products within the container chambers. However, the closure can be fabricated for selectively dispensing products either separately or simultaneously, and still be within the scope of the present invention in its broadest aspect. It is currently preferred that wall 22 be centrally disposed within the container and divide the container into chambers of equal volume. However, wall 22 could be extruded and blown off-center without departing from the invention in its broadest aspects. The invention has been disclosed in conjunction with a number of modifications and variations. Other modifications and variations will readily suggest themselves to persons of ordinary skill in the art. The invention is intended to embrace all such modifications and variations as fall within the spirit and broad scope of the appended claims.

What is claimed is:

1. A method of making a dual-chamber plastic container that comprises the steps of:

(a) injection molding a container finish that includes a pair of spaced outlet openings, (b) extruding from said finish a hollow tubular body having a peripheral wall extending from a periphery of said finish, and an integrally extruded wall extending from between said openings and dividing said body into separate chambers, (c) capturing said tubular body between mold segments, (d) blowing said peripheral wall within said mold segments by application of air simultaneously and at equal pressures to said chambers through said openings, and (e) removing the container from said mold segments.

2. The method set forth in claim 1 wherein said step (a) comprises extruding plastic through extrusion tooling, including an orifice bushing surrounding a mandrel tip, into finish mold tooling, and wherein said step (b) is carried out while moving said finish mold tooling relative to said extrusion tooling while continuing to extrude plastic through said extrusion tooling.

3. The method set forth in claim 2 wherein said mandrel tip of said extrusion tooling includes a central passage through which plastic is extruded to form said integrally extruded wall.

4. The method set forth in claim 3 wherein said finish mold tooling includes a core having an air passage with a single inlet and spaced outlets for registry with said chambers.

5. The method set forth in claim 4 wherein said finish mold tooling further includes a pair of hollow finish plugs removably received in said core and cooperating with said extrusion mold tooling to form a finish mold cavity.

6. The method set forth in claim 1 wherein said step (b) is such that said integrally extruded wall is no more than 0.015 inch thick in the container following said step (e).

7. A method of making a dual-chamber plastic container that comprises the steps of:

(a) extruding a tubular plastic body having a peripheral wall and an integrally extruded wall dividing said body into separate chambers, (b) capturing said tubular body between mold segments, (c) blowing said peripheral wall within said mold segments by application of air simultaneously and at equal pressures to said chambers, and, (d) removing the container from said mold segments.

8. The method set forth in claim 7 wherein said step (a) is carried out by extruding plastic through extrusion tooling including an orifice bushing surrounding a mandrel tip, said mandrel tip including a passage through which plastic is extruded to form said integrally extruded wall.

9. The method set forth in claim 7 wherein said step (a) is such that said integrally extruded wall is no more than 0.015 inch thick in the container following said step (d).

10. The method set forth in claim 7 comprising the additional step, prior to said step (a), of: (e) injection molding a container finish having a pair of spaced outlet openings that register with said chambers following said step (a), said step (a) comprising the step of extruding said body from said finish.

11. A one-piece dual-chamber plastic container made in accordance with the method set forth in claim 1.

12. A one-piece dual-chamber plastic container made in accordance with the method set forth in claim 7.

* * * * *